United States Patent
Miles et al.

(10) Patent No.: US 11,121,773 B2
(45) Date of Patent: Sep. 14, 2021

(54) SPLIT POWER-CONTROL ELECTRONICS WITH FIBER-OPTIC MULTIPLEXING

(71) Applicant: Hamilton Sundstrand Corporation, Charlotte, NC (US)

(72) Inventors: Gary L. Miles, Stillman Valley, IL (US); Christopher J. Courtney, Janesville, WI (US); Michael C. Harke, DeForest, WI (US); Mustansir Kheraluwala, Lake Zurich, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/791,034

(22) Filed: Feb. 14, 2020

(65) Prior Publication Data
US 2021/0258073 A1    Aug. 19, 2021

(51) Int. Cl.
*H04B 10/25*    (2013.01)
*B64D 41/00*    (2006.01)
*H02J 4/00*    (2006.01)

(52) U.S. Cl.
CPC ............ *H04B 10/25* (2013.01); *B64D 41/00* (2013.01); *H02J 4/00* (2013.01); *B64D 2221/00* (2013.01)

(58) Field of Classification Search
CPC .... H04B 10/25; B64D 41/00; B64D 2221/00; H02J 3/00
See application file for complete search history.

(56) References Cited

U.S. PATENT DOCUMENTS

| | | | |
|---|---|---|---|
| 6,972,972 B2 | 12/2005 | Duncan et al. | |
| 7,074,182 B2* | 7/2006 | Rovegno | A61B 1/00052 348/E7.087 |
| 7,296,753 B1 | 11/2007 | Zucker | |
| 7,615,892 B2 | 11/2009 | Anghel et al. | |
| 7,922,117 B2 | 4/2011 | Wavering et al. | |
| 7,948,356 B2* | 5/2011 | Kawamura | H04W 52/0251 340/3.1 |
| 7,995,914 B2* | 8/2011 | So | H04L 45/245 398/5 |
| 8,224,292 B2* | 7/2012 | Kim | H04M 1/724 455/411 |
| 9,124,198 B2 | 9/2015 | Krenz et al. | |

(Continued)

FOREIGN PATENT DOCUMENTS

| | | |
|---|---|---|
| CN | 109802592 A | 5/2019 |
| EP | 2690785 A2 | 1/2014 |

OTHER PUBLICATIONS

Search Report for European Application No. 21156834.0 dated Jul. 1, 2021.

*Primary Examiner* — Dinh T Le
(74) *Attorney, Agent, or Firm* — Cantor Colburn LLP

(57) ABSTRACT

Provided are embodiments of a system for split power-control electronics with fiber-optic multiplexing. The system includes one or more power electronics modules configured to provide power to a load, and a control card configured to control the one or more power electronics modules. The system also includes a control module configured to receive and process the control card, and one or more connections, the one or more connections configured to connect a control module to the one or more power electronics modules. Also provided are embodiments of a method for operating power electronics modules in a redundant mode.

14 Claims, 3 Drawing Sheets

(56) References Cited

U.S. PATENT DOCUMENTS

| | | |
|---|---|---|
| 9,561,761 B2 | 2/2017 | Walstrom et al. |
| 9,647,455 B2 | 5/2017 | Gao et al. |
| 10,602,246 B2 * | 3/2020 | Rao ..................... H04J 14/0293 |
| 2009/0245783 A1 * | 10/2009 | So ........................ H04J 14/025 |
| | | 398/5 |
| 2012/0007531 A1 | 1/2012 | Krishnamoorthy et al. |
| 2012/0194146 A1 * | 8/2012 | Longacre ................ G06F 1/266 |
| | | 323/234 |
| 2019/0280617 A1 | 9/2019 | Lacaux et al. |

* cited by examiner

SPLIT POWER-CONTROL ELECTRONICS WITH FIBER-OPTIC MULTIPLEXING

BACKGROUND

The present disclosure relates to electric power systems, and more specifically, to split power-control electronics with fiber-optic multiplexing.

In today's environment, aircraft are incorporating more and more power electronics (such as motor drives, active rectifiers, power converters, etc.) for operation. Due to power requirements, the power electronics tend to be large and heavy taking up the limited real-estate in the aircraft. In addition, the reliability of the controls that are used to operate the power electronics must be maintained as these components are integrated into the aircraft system.

BRIEF DESCRIPTION

According to an embodiment, a split power control system with fiber-optic multiplexing is provided. The system includes one or more power electronics modules configured to provide power to a load; a control card configured to control the one or more power electronics modules; a control module configured to receive and process the control card; and one or more connections, the one or more connections configured to connect a control module to the one or more power electronics modules.

In addition to one or more of the features described herein, or as an alternative, further embodiments include a motor load.

In addition to one or more of the features described herein, or as an alternative, further embodiments include one or more connections that are fiber-optic cables.

In addition to one or more of the features described herein, or as an alternative, further embodiments include a control card that is operably coupled to two or more power electronics modules.

In addition to one or more of the features described herein, or as an alternative, further embodiments include a control module that is in a separate location from the one or more power electronic modules.

In addition to one or more of the features described herein, or as an alternative, further embodiments include a control module that is located within a temperature-controlled environment.

In addition to one or more of the features described herein, or as an alternative, further embodiments include a control module that is in a separate housing than the one or more power electronics modules.

In addition to one or more of the features described herein, or as an alternative, further embodiments include one or more power electronics modules that are co-located with the load in an un-controlled temperature and pressure environment.

In addition to one or more of the features described herein, or as an alternative, further embodiments include a control module that is configured to receive a second control card, wherein the second control card is configured to operate the one or more power electronics modules.

According to an embodiment, a method for operating power electronics modules in a redundant mode is provided. The method includes processing, by a control module, a control card to generate control signals; providing the control signals to one or more power electronics modules over one or more connections; controlling one or more power electronics modules based at least in part on the control signals; and operating a load coupled to the one or more power electronics modules based on the control signals.

In addition to one or more of the features described herein, or as an alternative, further embodiments include one or more connections that are fiber-optic cables.

In addition to one or more of the features described herein, or as an alternative, further embodiments include operably coupling the control card to two or more power electronics modules.

In addition to one or more of the features described herein, or as an alternative, further embodiments include processing the control card, by the control module, occurs in a separate location from the one or more power electronic modules.

In addition to one or more of the features described herein, or as an alternative, further embodiments include processing the control card, by the control module, occurs in a temperature-controlled environment.

In addition to one or more of the features described herein, or as an alternative, further embodiments include a control module that is located in a separate housing or chassis than the one or more power electronics modules.

In addition to one or more of the features described herein, or as an alternative, further embodiments include one or more power electronics modules that are co-located with the load.

In addition to one or more of the features described herein, or as an alternative, further embodiments include receiving, by the control module, a second control card, wherein the second control card is configured to operate the one or more power electronics modules.

In addition to one or more of the features described herein, or as an alternative, further embodiments include using a second control card that is configured in a back-up mode during a failure event of a primary control card.

In addition to one or more of the features described herein, or as an alternative, further embodiments include using a second control card that is configured in a redundant mode to share control with a primary control card.

In addition to one or more of the features described herein, or as an alternative, further embodiments include using a second control card that is configured in a dedicated mode to control the one or more power electronics modules, respectively.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

In existing architectures, power electronics tend to be packaged in large units that contain all of the control modules and high power components. In some cases, they are coupled or packaged with the load. Since the heat-producing power components are in proximity to the control modules, the low-power control components can become thermally stressed.

In order to reduce the overheating of these devices various cooling techniques can be used. Techniques can include large passive heat sinks or active cooling provided by fans or liquid cooling. These mechanisms also take up space in the limited areas of the aircraft. The overheating of these components can lead to failing components resulting in reduced reliability of the system.

The techniques described herein provide for re-locating the low-power, thermally-limited, sensitive electronics from the high-heat producing power electronic components. That is, the low-power control elements are split (physically separated) from the large heat-producing power electronics elements that are used for driving the load and are placed within temperature-controlled environments. The low-power control electronics are coupled to the high-power electronics using fiber-optic cables. The fiber-optic cables are much lighter than the conventional copper-based cables. In addition, given the much higher bandwidth capabilities of the fiber-optic cables, a single cable can be used to transmit (or multiplex) multiple signals as compared to conventional copper-based signal cables which can couple only one signal.

Figure 1:
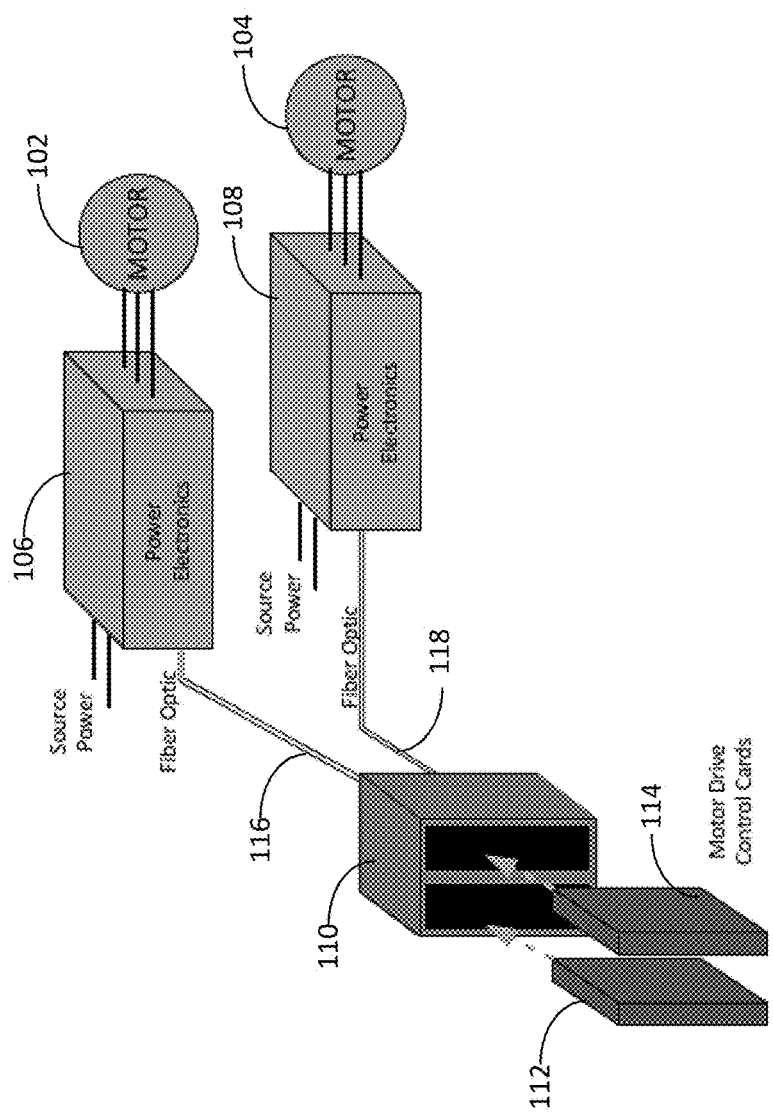
FIG. 1 depicts a system in accordance with one or more embodiments of the disclosure.

FIG. 1 depicts a system 100 of an architecture for a split-power control electronics system with multiplexing in accordance with one or more embodiments. As shown in FIG. 1, the system 100 includes electrical machines (motor, generator) 102 and 104 that are driven by power from the power electronics 106 and 108, respectively. The power electronics 106, 108 receive power from a power source. Example power electronics 106, 108 can include but are not limited to insulated-gate bipolar transistors (IGBT), gate-drives, other high-power electronic switches, filters, etc. In one or more embodiments of the disclosure, the power electronics 106, 108 are used to drive the electrical machines 102, 104, respectively. An example electrical machine can include a 3-phase motor as shown.

The system 100 also includes a card control module 110 that is configured to receive motor control cards 112 and 114. The motor drive control cards 112 and 114 can be operably connected to and processed by the control module 110. In one or more embodiments of the disclosure, a single motor drive control card 112 can operate both of the power electronics 106 and 108. In other embodiments, a redundant motor control card can be configured to operate both of the power electronics 106, 108 in the event there is a failure in the primary motor drive control card. In some other embodiments, the first and second motor drive control cards can be configured to operate half of the power electronics or be dedicatedly configured to each respective power electronics 106, 108. It should be understood the motor drive control cards 112, 114 can be configured in different arrangements and is not limited by those described herein. The arrangement of the motor drive control cards provides for back-up modes, redundant modes, and dedicated modes of operation. In addition, it can reduce the complexity of the system 100.

The control module 110 provides control signals to control the power electronics 106 over a first connection 116 and over a second connection 118. A first channel includes the motor 102, the power electronics 106, and the first fiber-optic connection 116, and the second channel includes the motor 104, the power electronics 108, and the connections 118. Although only two channels are shown, it should be understood that additional channels can be implemented and are not limited by the architecture shown in FIG. 1.

In some embodiments of the disclosure, the connections 116 and 118 are fiber-optic cables. The optical fiber elements of the fiber-optic cables are packaged in bundles and carry signals in the form of light. The fiber-optic cables are capable of transmitting data at very high speeds. In addition, the fiber-optic cables are robust enough to limit the interference or cross-talk from unwanted sources such as neighboring cables.

In one or more embodiment of the disclosure, the high power electronics 106, 108 can be co-located with the motors 102, 104 to minimize the power-feeder weight used for the connection. Co-locating high power electronics and a motor or generator, results in reducing or eliminating bulky power quality filters in the power electronics section to further help reduce the weight and size. In addition, the high-power electronics 106, 108 and the motors 102, 104 can share cooling systems to conserve the limited space of the aircraft.

Figure 2:
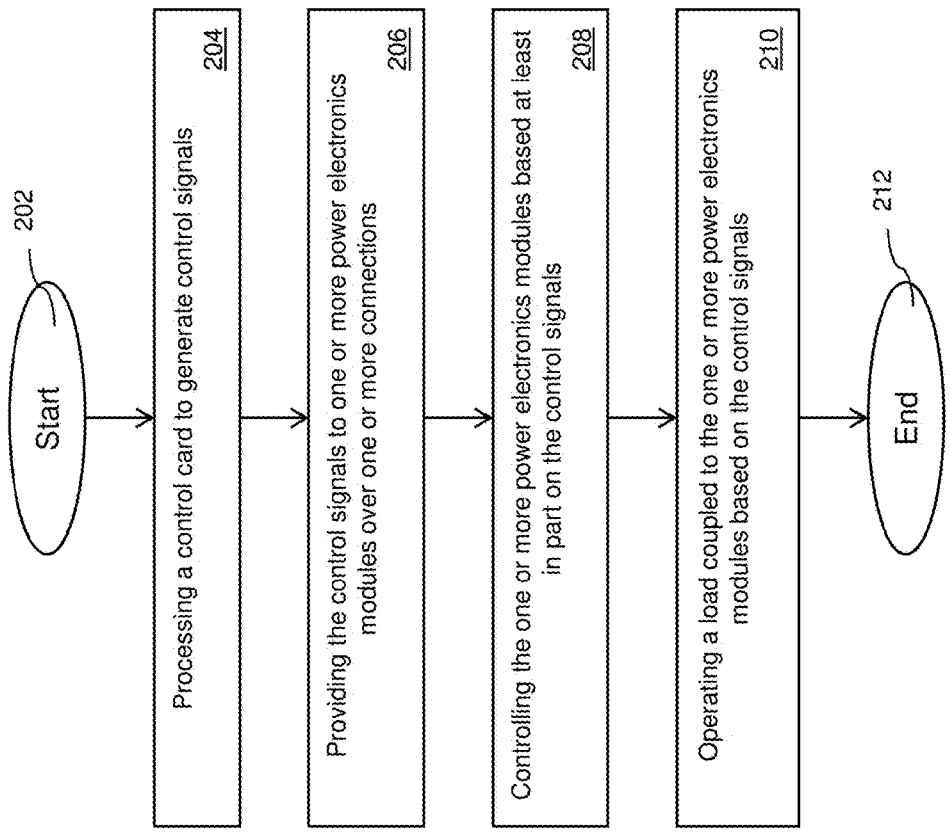
FIG. 2 depicts a flowchart of a method in accordance with one or more embodiments of the disclosure.

FIG. 2 depicts a method 200 for operating a split power control system in accordance with one or more embodiments of the disclosure. The method 200 begins at block 202 and proceeds to block 204 which provides for processing, by a control module, a control card to generate control signals. Block 206 provides the control signals to one or more power electronics modules over one or more connections. In one or more embodiments the control card and control module are located in a separate location from the power electronics modules. The control modules are coupled to the power electronics modules using fiber-optic cables which are capable of multiplexing a plurality of control signals over the same cable. In addition, by locating the control cards and control module away from the higher heat-producing power components/electronics, failure from thermal stress is greatly reduced. Block 208 controls one or more power electronics modules based at least in part on the control signals, and block 210 operates a load (motor) coupled to the one or more power electronics modules based on the control signals. The method 200 ends at block 212. It should be understood that additional steps can be used and is not intended to be limited by the steps shown in FIG. 2.

Figure 3:
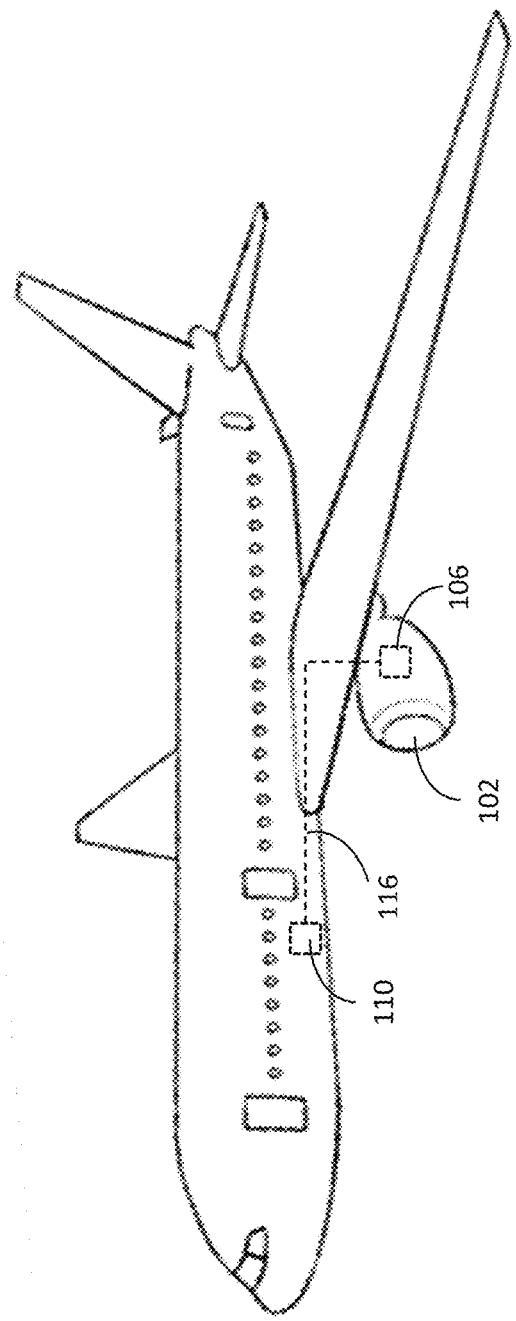
FIG. 3 depicts an aircraft that may be used in accordance with one or more embodiments of the disclosure.

FIG. 3 depicts an aircraft 300 that can implement the system 100 in accordance with one or more embodiments. It should be understood the architecture of the system 100 separating the power electronics 106, 108 from the control card(s) 112, 114 can be implemented in any vehicle and is not limited by the aircraft 300 shown in FIG. 3. In one or more embodiments of the disclosure, the control module 110, the motor drive control cards 112, 114 are located in an environmentally-regulated electronics bay. The low-power electronics are easier to cool when they are located within the aircraft and provide for a better environment for increased reliability. The motors 102, 104 and power electronics 106, 108 are co-located and leverage the same cooling systems.

The techniques described herein provide a layout for split power-control electronics architecture that separates the low-power control elements from large heat-producing power electronics elements driving the motors. In addition, a single card can now control multiple power electronics modules by multiplexing the data over the fiber-optic cables, unlike the conventional systems that require dedicated control cards.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for split power-control electronics with fiber-optic multiplexing, the system comprising:
   a plurality of power electronics modules; each power electronics module configured to provide power to a respective load, wherein the respective load is a motor;
   a control card configured to control the plurality of power electronics modules;
   a control module configured to receive and process the control card; and one or more connections, the one or more connections configured to connect the control module to the plurality of power electronics modules.

2. The system of claim 1, wherein the one or more connections are fiber-optic cables.

3. The system of claim 1, wherein the control card is operably coupled to two or more power electronics modules.

4. The system of claim 1, wherein the control module is in a separate location from the one or more power electronic modules.

5. The system of claim 1, wherein the control module is in a separate housing than the plurality of power electronics modules.

6. The system of claim 1, wherein the control module is configured to receive a second control card, wherein the second control card is configured to operate the plurality of power electronics modules.

7. A method for operating power electronics modules in a redundant mode, the method comprising:
   processing, by a control module, a primary control card to generate control signals;
   providing the control signals to a plurality of power electronics modules over one or more connections;
   controlling the plurality of power electronics modules based at least in part on the control signals; and
   operating a respective load coupled to each of the plurality of power electronics modules based on the control signals, wherein the respective load is a motor.

8. The method of claim 7, wherein the one or more connections are fiber-optic cables.

9. The method of claim 7, further comprising operably coupling the control card to two or more power electronics modules.

10. The method of claim 7, further comprising processing the control card, by the control module, in a separate location from the plurality of power electronic modules.

11. The method of claim 7, wherein the control module is in a separate housing or chassis than the plurality of power electronics modules.

12. The method of claim 7, further comprising receiving, by the control module, a second control card, wherein the second control card is configured to operate the one or more power electronics modules.

13. The method of claim 12, wherein the second control card is configured in a back-up mode during a failure event of the primary control card.

14. The method of claim 12, wherein the second control card is configured in a redundant mode to share control with the primary control card.

* * * * *